(12) United States Patent
Brinas

(10) Patent No.: US 10,131,209 B2
(45) Date of Patent: Nov. 20, 2018

(54) AIRFLOW OUTLET ASSEMBLY AND A PASSENGER COMPARTMENT FOR A VEHICLE

(71) Applicant: GM GLOBAL TECHNOLOGY OPERATIONS LLC, Detroit, MI (US)

(72) Inventor: Gerard Alan Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 728 days.

(21) Appl. No.: 14/535,517

(22) Filed: Nov. 7, 2014

(65) Prior Publication Data

US 2016/0129762 A1 May 12, 2016

(51) Int. Cl.
*B60H 1/34* (2006.01)

(52) U.S. Cl.
CPC ......... *B60H 1/3421* (2013.01); *B60H 1/3428* (2013.01)

(58) Field of Classification Search
CPC ..... B60H 1/3421; B60H 1/3428; F24F 11/00; F24F 11/0012; F24F 11/0034; F24F 11/0078; F24F 13/15; G05D 23/1902
USPC ............... 454/256, 315, 316, 317, 324, 155; 251/300
See application file for complete search history.

(56) References Cited

U.S. PATENT DOCUMENTS

| | | | | |
|---|---|---|---|---|
| 2,246,354 A | * | 6/1941 | Garlinghouse | ....... E04G 21/025 222/503 |
| 5,188,561 A | * | 2/1993 | Nissimoff | ................ F24F 11/00 454/256 |
| 6,578,743 B1 | * | 6/2003 | Kokeisl | .................. B65D 88/68 222/342 |
| 8,413,954 B1 | * | 4/2013 | Burrow | ................ B65B 39/001 251/147 |
| 2005/0107027 A1 | | 5/2005 | Kachi | |
| 2014/0120823 A1 | | 5/2014 | Brinas | |

(Continued)

FOREIGN PATENT DOCUMENTS

| | | |
|---|---|---|
| CN | 101293472 A | 10/2008 |
| CN | 201342920 Y | 11/2009 |
| DE | 10202532 C1 * | 5/2003 ............... B60H 1/34 |

OTHER PUBLICATIONS

DE10202532MT; machine translation of DE 10202532 C1.*

*Primary Examiner* — Gregory Huson
*Assistant Examiner* — Elizabeth M May
(74) *Attorney, Agent, or Firm* — Quinn IP Law

(57) ABSTRACT

An airflow outlet assembly and a passenger compartment for a vehicle are disclosed. The airflow outlet assembly includes a support member and a first outlet component. The first outlet component includes a first plate and a first vane extending outwardly from the first plate. The first outlet component is supported by the support member. The airflow outlet assembly further includes a second outlet component. The second outlet component includes a second plate and a second vane extending outwardly from the second plate. The second outlet component is supported by the support member. The first and second outlet components are rotatably coupled to each other such that rotation of the first and second outlet components in opposite directions changes the position of the first and second plates and the first and second vanes relative to the support member.

20 Claims, 3 Drawing Sheets

(56) References Cited

U.S. PATENT DOCUMENTS

2014/0230942 A1* 8/2014 Takai ................... B60H 1/345
                                                    138/45
2016/0361979 A1* 12/2016 Brinas ................ B60H 1/3442

* cited by examiner

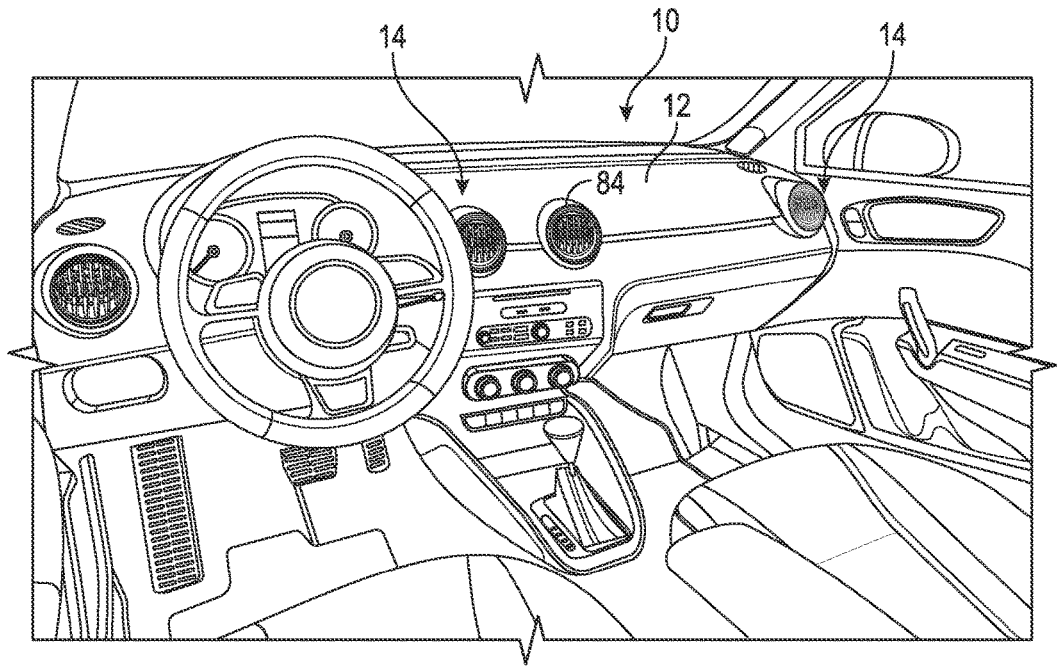
FIG. 1
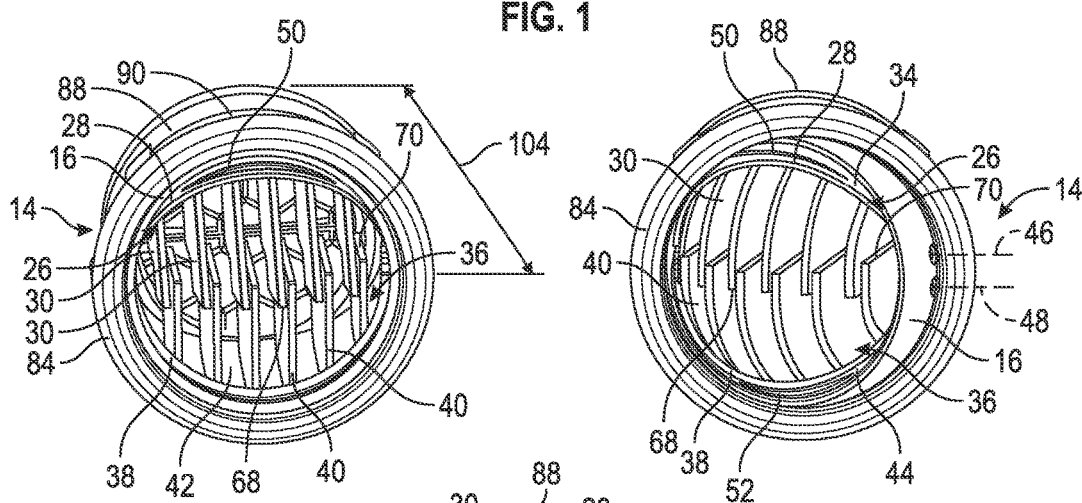
FIG. 2
FIG. 9
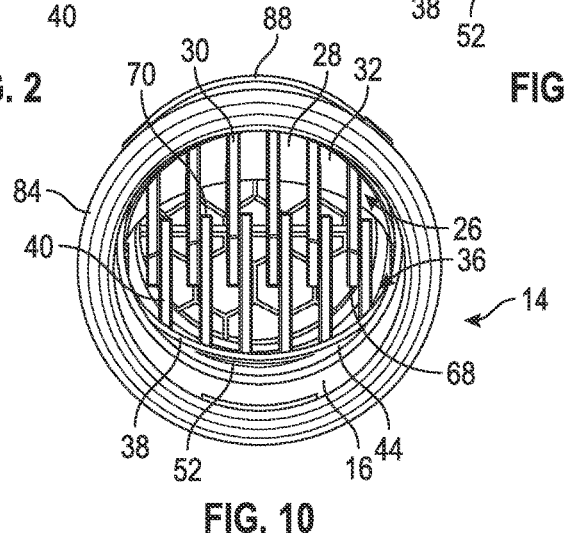
FIG. 10

AIRFLOW OUTLET ASSEMBLY AND A PASSENGER COMPARTMENT FOR A VEHICLE

TECHNICAL FIELD

The present disclosure relates to an airflow outlet assembly and a passenger compartment for a vehicle.

BACKGROUND

Many vehicles include a passenger compartment in which airflow into the passenger compartment can be controlled. For example, vents can control the amount of airflow into the passenger compartment. Vents can be adjustable to increase or decrease the amount of airflow into the passenger compartment, as well as control the direction that the airflow enters the passenger compartment.

One type of vent includes a housing defining an opening with a plurality of vanes fixed to the housing inside the opening. In other words, the vanes are stationary. Airflow can selectively move through the opening about the vanes. A pair of doors are movable relative to the housing behind the vanes, and movement of the doors change the amount of airflow through the opening and about the vanes. A rotary knob is operatively connected to a drive mechanism that moves the doors. Therefore, rotation of the rotary knob operates the drive mechanism and the drive mechanism operates the doors.

The doors are split in half such that each of the doors defines a half-circular configuration. Therefore, when the doors block the opening in a fully closed position, the doors cooperate to define a circle that is complementary to the diameter of the opening. When the doors are in a fully open position, the doors are folded in half adjacent to each other to define a half-circle, and this half-circular configuration requires a large packaging space inside the housing. As such, the fore-aft depth of the housing is large to accommodate the half-circular configuration of each of the doors when folded together in the fully open position.

SUMMARY

The present disclosure provides an airflow outlet assembly including a support member and a first outlet component. The first outlet component includes a first plate and a first vane extending outwardly from the first plate. The first outlet component is supported by the support member. The airflow outlet assembly further includes a second outlet component. The second outlet component includes a second plate and a second vane extending outwardly from the second plate. The second outlet component is supported by the support member. The first and second outlet components are rotatably coupled to each other such that rotation of the first and second outlet components in opposite directions changes the position of the first and second plates and the first and second vanes relative to the support member.

The present disclosure also provides a passenger compartment for a vehicle. The passenger compartment includes a dashboard and an airflow outlet assembly coupled to the dashboard. The airflow outlet assembly includes a support member and a first outlet component. The first outlet component includes a first plate and a first vane extending outwardly from the first plate. The first outlet component is supported by the support member. The airflow outlet assembly further includes a second outlet component. The second outlet component includes a second plate and a second vane extending outwardly from the second plate. The second outlet component is supported by the support member. The first and second outlet components are rotatably coupled to each other such that rotation of the first and second outlet components in opposite directions changes the position of the first and second plates and the first and second vanes relative to the support member which changes an amount of fluid communication out of the airflow outlet assembly.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic fragmentary perspective view of a passenger compartment.

FIG. 2 is a schematic perspective view of an airflow outlet assembly compatible with the passenger compartment of FIG. 1.

FIG. 9 is a schematic front view of the first and second outlet components in the fully open position and the direction of airflow changed as compared to FIG. 2.

FIG. 10 is a schematic front view of the first and second outlet components in the fully open position and the direction of airflow changed as compared to FIGS. 2 and 9.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Referring to the Figures, wherein like numerals indicate like or corresponding parts throughout the several views, a passenger compartment 10 for a vehicle is generally shown in FIG. 1.

The passenger compartment 10 can include a dashboard 12 and an airflow outlet assembly 14 coupled to the dashboard 12. The airflow outlet assembly 14 can be in fluid communication with the passenger compartment 10. The airflow outlet assembly 14 can also be in fluid communication with a heating, ventilation and air conditioning (HVAC) unit. Therefore, heated air, ambient air and/or cooled air can be delivered to the passenger compartment 10 through the airflow outlet assembly 14. As shown in FIG. 1, a plurality of airflow outlet assemblies 14 can be coupled to the dashboard 12. Each of the airflow outlet assemblies 14 can be in fluid communication with the HVAC unit and the passenger compartment 10. Each of the airflow outlet assemblies 14 are configured the same; therefore, for the below discussion one airflow outlet assembly 14, as shown in FIG. 2, is described in detail.

Figure 3:
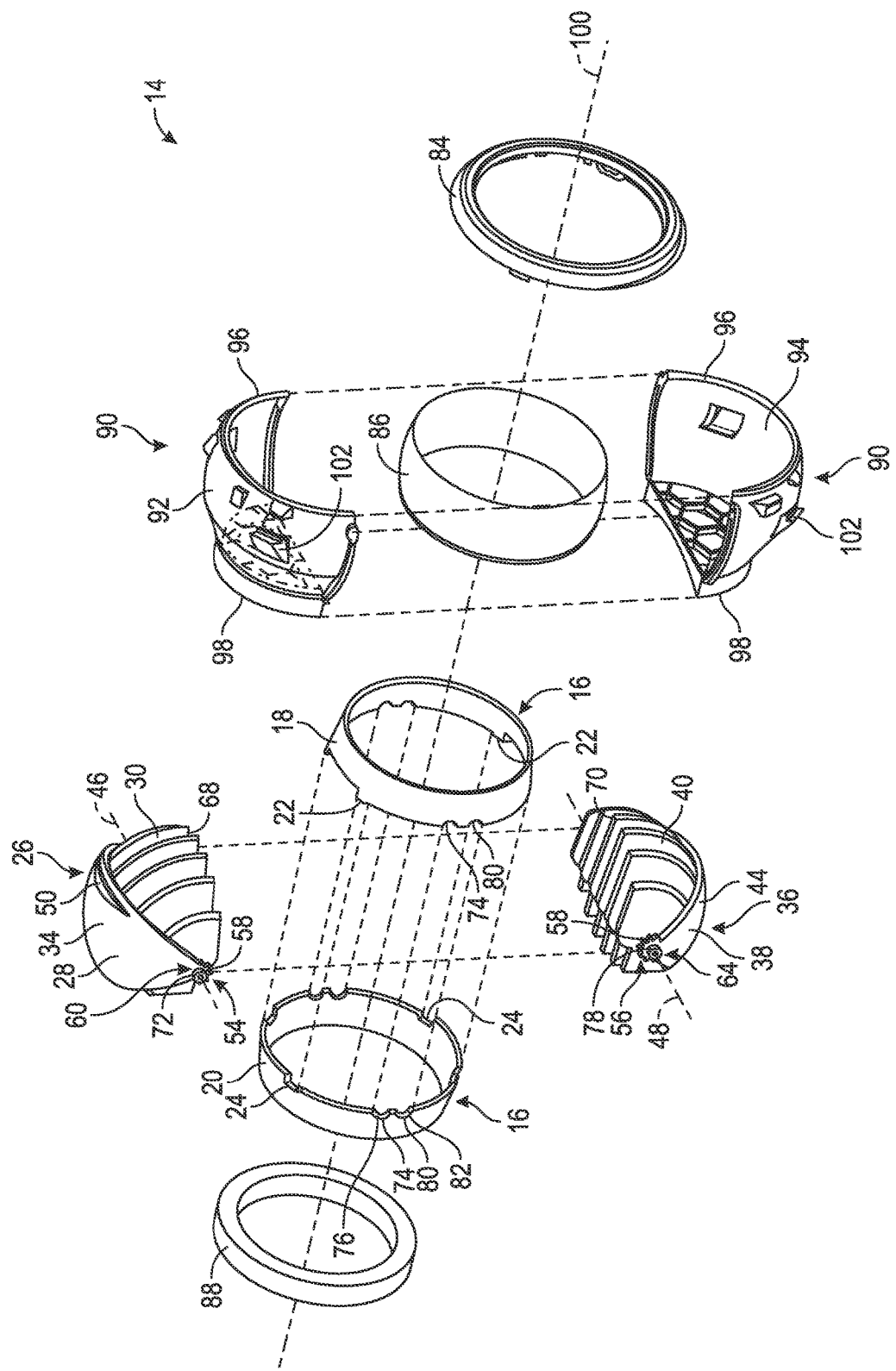
FIG. 3 is a schematic perspective exploded view of the airflow outlet assembly of FIG. 2.

Referring to FIGS. 3-7, the airflow outlet assembly 14 includes a support member 16. The support member 16 can be formed as a single or unitary piece or a plurality of pieces. For example, as shown in FIG. 3, the support member 16 can be a collar including a first ring portion 18 and a second ring portion 20, i.e., the plurality of pieces. The first and second ring portions 18, 20 cooperate with each other. The first ring portion 18 can include one or more tabs 22 and the second ring portion 20 can include one or more cutouts 24 cooperating with respective tabs 22. One of the tabs 22 is disposed in one of the cutouts 24 to attach or secure the first and second ring portions 18, 20 together. It is to be appreciated that the first and second ring portions 18, 20 can include features other than the tabs 22 and cutouts 24 to attach or secure the first and second ring portions 18, 20 together, for example, one or more fasteners, clips, snaps, etc., can be utilized.

Continuing with FIGS. 2-7, the airflow outlet assembly 14 further includes a first outlet component 26. The first outlet component 26 includes a first plate 28 and a first vane 30 extending outwardly from the first plate 28. The first outlet component 26 is supported by the support member 16. Specifically, the first and second ring portions 18, 20 cooperate to support the first outlet component 26. The first plate 28 can include an inner surface 32 and an outer surface 34 opposing the inner surface 32 of the first plate 28. The first vane 30 can extend from the inner surface 32 of the first plate 28.

Continuing with FIGS. 2-7, the airflow outlet assembly 14 includes a second outlet component 36. The second outlet component 36 includes a second plate 38 and a second vane 40 extending outwardly from the second plate 38. The second outlet component 36 is supported by the support member 16. Specifically, the first and second ring portions 18, 20 cooperate to support the second outlet component 36. The second plate 38 can include an inner surface 42 and an outer surface 44 opposing the inner surface 42 of the second plate 38. The second vane 40 can extend from the inner surface 42 of the second plate 38.

Figure 5:
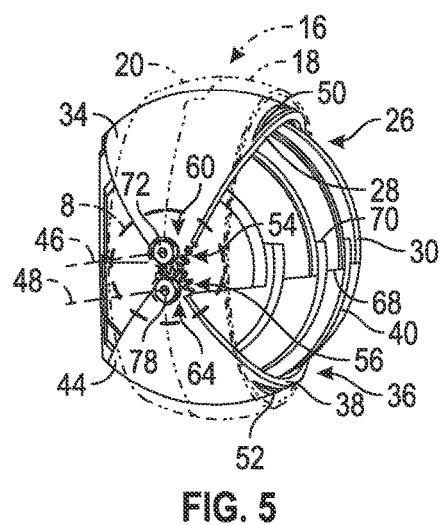
FIG. 5 is a schematic perspective view of the first outlet component and the second outlet component in the fully open position, with the support member illustrated in phantom lines.
Figure 6:
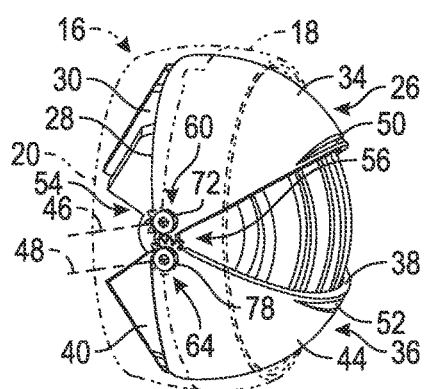
FIG. 6 is a schematic perspective view of the first outlet component and the second outlet component in a partially open/closed position, with the support member illustrated in phantom lines.

Comparing FIGS. 5 and 6, the first and second outlet components 26, 36 are rotatably coupled to each other such that rotation of the first and second outlet components 26, 36 in opposite directions changes the position of the first and second plates 28, 38 and the first and second vanes 30, 40 relative to the support member 16. Specifically, rotation of the first and second outlet components 26, 36 in opposite directions changes the position of the first and second plates 28, 38 and the first and second vanes 30, 40 relative to the support member 16 which changes an amount of fluid communication out of the airflow outlet assembly 14. Therefore, changing the position of the first and second plates 28, 38 changes the amount of airflow with the passenger compartment 10. As such, the amount of airflow, i.e., heated air, ambient air and/or cooled air, can be adjusted as desired by an occupant of the passenger compartment 10.

Figure 4:
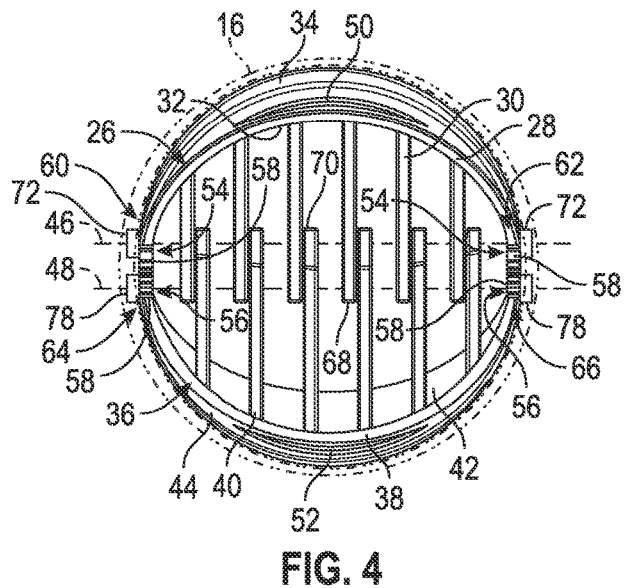
FIG. 4 is a schematic front view of a first outlet component and a second outlet component in a fully open position, with a support member illustrated in phantom lines.
Figure 7:
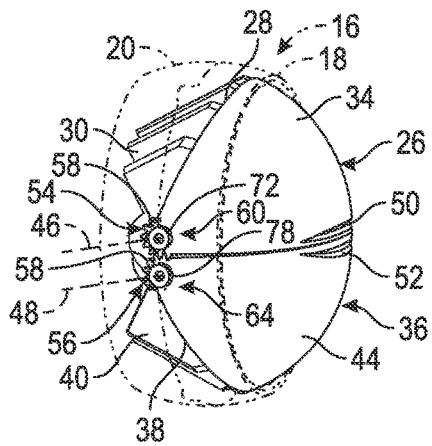
FIG. 7 is a schematic perspective view of the first outlet component and the second outlet component in a fully closed position, with the support member illustrated in phantom lines.
Figure 8:
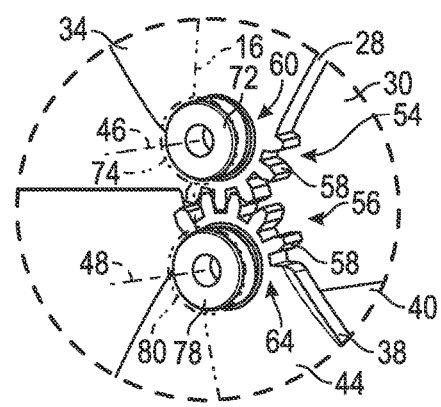
FIG. 8 is a schematic perspective view of the first and second outlet components taken from circled area labeled 8 in FIG. 5.

As best shown in FIGS. 4 and 8, in certain embodiments, the first outlet component 26 is rotatable relative to the support member 16 about a first axis 46 and the second outlet component 36 is rotatable relative to the support member 16 about a second axis 48. The first and second axes 46, 48 can be spaced from and substantially parallel to each other such that the first and second outlet components 26, 36 rotate in opposite directions about separate first and second axes 46, 48 respectively. For example, the first and second outlet components 26, 36 can be rotated to a fully open position as shown in FIGS. 2, 4, 5, 9 and 10, can be rotated to a fully closed position as shown in FIG. 7 and can be rotated to a partially open/closed position as shown in FIG. 6. As suggested by the Figures, when the first and second outlet components 26, 36 are in the fully open position, a maximum amount of airflow is in fluid communication with the passenger compartment 10. Furthermore, as suggested by the Figures, when the first and second outlet components 26, 36 are in the fully closed position, a minimum amount of airflow is in fluid communication with the passenger compartment 10. Additionally, as suggested by the Figures, when the first and second outlet components 26, 36 are in the partially open/closed position, a reduced amount of airflow is in fluid communication with the passenger compartment 10. In other words, when in the partially open/closed position, the first and second outlet components 26, 36 partially blocks or impedes the airflow with the passenger compartment 10 which reduces the amount of airflow compared to the fully open position.

Generally, at least one of the first and second outlet components 26, 36 can include a grip to rotate the components 26, 36 between the positions. As best shown in FIGS. 4-7, the outer surface 34 of the first plate 28 can define a first recess 50 for rotating the first outlet component 26. Furthermore, the outer surface 44 of the second plate 38 can define a second recess 52 for rotating the second outlet component 36. The first and second outlet components 26, 36 are geared to each other, so moving the first outlet component 26 by the first recess 50 correspondingly moves the second outlet component 36; and similarly, moving the second outlet component 36 by the second recess 52 correspondingly moves the first outlet component 26. The grip can be any suitable configuration and the Figures illustrate one suitable configuration of the grip as the first recess 50 and the second recess 52. For example, the grip can be a handle, a knob, etc.

As briefly mentioned above, the first and second outlet components 26, 36 are geared to each other. Referring to FIGS. 3-8, the first outlet component 26 can include a first gear 54 rotatable about the first axis 46 and the second outlet component 36 can include a second gear 56 rotatable about the second axis 48. The first and second gears 54, 56 mesh together such that rotation of the gears 54, 56 correspondingly rotates the first and second outlet components 26, 36 in opposite directions. The first and second gears 54, 56 can each include external teeth 58 that cooperate with each other.

Turning to FIG. 4, the first plate 28 can include a first end 60 and a second end 62 spaced from each other, and in certain embodiments, the first and second ends 60, 62 of the first plate 28 are spaced from each other along the first axis 46. The first gear 54 can be disposed at one of the first and second ends 60, 62 of the first plate 28. In certain embodiments, the first gear 54 can be further defined as a plurality of first gears 54. In this embodiment, one of the first gears 54 is disposed at the first end 60 of the first plate 28 and another one of the first gears 54 is disposed at the second end 62 of the first plate 28.

Continuing with FIG. 4, the second plate 38 can include a first end 64 and a second end 66 spaced from each other, and in certain embodiments, the first and second ends 64, 66 of the second plate 38 are spaced from each other along the second axis 48. The second gear 56 can be disposed at one of the first and second ends 64, 66 of the second plate 38. In certain embodiments, the second gear 56 can be further defined as a plurality of second gears 56. In this embodiment, one of the second gears 56 is disposed at the first end 64 of the second plate 38 and another one of the second gears 56 is disposed at the second end 66 of the second plate 38. Continuing with this embodiment, generally, one of the first gears 54 and one of the second gears 56 mesh together, and another one of the first gears 54 and another one of the second gears 56 mesh together.

The first and second gears 54, 56 can be attached to the first and second plates 28, 38 respectively by any suitable methods. For example, in certain embodiments, the first gears 54 are integral with the first plate 28 and similarly, the second gears 56 are integral with the second plate 38. Specifically, in certain embodiments, the teeth 58 of the first gears 54 are integral with the first plate 28 and the teeth 58 of the second gears 56 are integral with the second plate 38. Therefore, for example, the first gears 54 and the first plate 28 can be molded as one piece, and similarly, the second gears 56 and the second plate 38 can be molded as one piece. In other embodiments, the first and second gears 54, 56 are attached to respective first and second plates 28, 38 by fasteners, adhesive, welding, etc.

As best shown in FIGS. 2-4, in certain embodiments, the first vane 30 can be further defined as a plurality of first vanes 30 spaced from each other. In this embodiment, each of the first vanes 30 extends outwardly from the first plate 28. Specifically, the first vanes 30 can extend from the inner surface 32 of the first plate 28. The first vanes 30 can extend away from the outer surface 34 of the first plate 28 toward the second plate 38. The first vanes 30 can be spaced from each other in a substantially parallel relationship. It is to be appreciated that the first vanes 30 can be any suitable configuration and orientation.

Continuing with FIGS. 2-4, in certain embodiments, the second vane 40 can be further defined as a plurality of second vanes 40 spaced from each other. In this embodiment, each of the second vanes 40 extends outwardly from the second plate 38. Specifically, the second vanes 40 can extend from the inner surface 42 of the second plate 38. The second vanes 40 can extend away from the outer surface 44 of the second plate 38 toward the first plate 28. The second vanes 40 can be spaced from each other in a substantially parallel relationship. It is to be appreciated that the second vanes 40 can be any suitable configuration and orientation.

As best shown in FIGS. 2 and 4, in various embodiments, the first vanes 30 and the second vanes 40 are offset from each other such that one of the first vanes 30 is disposed between a pair of the second vanes 40, and one of the second vanes 40 is disposed between a pair of the first vanes 30. In other words, the first and second vanes 30, 40 alternate. Furthermore, the first and second vanes 30, 40 can at least partially overlap each other in the offset configuration. Therefore, a distal end 68 of the first vanes 30 extends beyond a distal end 70 of the second vanes 40. By offsetting the first and second vanes 30, 40, the vanes 30, 40 can pass each other during rotation of the first and second plates 28, 38.

One of the first vanes 30 and one of the second vanes 40 can abut each other along respective sides, and similarly, another one of the vanes 30, 40 and another one of the second vanes 40 can abut each other along respective sides. Therefore, one first vane 30 and one second vane 40 can cooperate to create one vane between the inner surface 32 of the first plate 28 and the inner surface 42 of the second plate 38. Furthermore, another first vane 30 and another second vane 40 can cooperate to create another vane between the inner surface 32 of the first plate 28 and the inner surface 42 of the second plate 38. When respective first and second vanes 30, 40 abut each other, the frictional engagement therebetween can maintain the desired position of the first and second outlet components 26, 36. The configuration/orientation of the first and second vanes 30, 40 when the first and second outlet components 26, 36 are in the fully open position provides a larger area that the airflow can flow through.

The first and second vanes 30, 40 can be attached to the first and second plates 28, 38 respectively by any suitable methods. For example, in certain embodiments, the first vanes 30 are integral with the first plate 28 and similarly, the second vanes 40 are integral with the second plate 38. Therefore, for example, the first vanes 30 and the first plate 28 can be molded as one piece, and similarly, the second vanes 40 and the second plate 38 can be molded as one piece. In other embodiments, the first and second vanes 30, 40 are attached to respective first and second plates 28, 38 by fasteners, adhesive, welding, etc. As such, the first plate 28 and the first vanes 30 rotate about the first axis 46 in unison or as a unit. Said differently, the first plate 28 and the first vanes 30 move concurrently with each other. Similarly, the second plate 38 and the second vanes 40 rotate about the second axis 48 in unison or as a unit. Said differently, the second plate 38 and the second vanes 40 move concurrently with each other.

Referring to FIGS. 3, 4 and 8, the first outlet component 26 can include a first post 72 extending outwardly from the outer surface 34 of the first plate 28. The first post 72 can be supported by the support member 16, and the first post 72 supports the first outlet component 26 relative to the support member 16. Simply stated, the first post 72 supports the first outlet component 26 during rotation about the first axis 46. In certain embodiments, the first post 72 can be further defined as a plurality of first posts 72 (see FIG. 4). In this embodiment, one of the first posts 72 can be disposed at the first end 60 of the first plate 28 and another one of the first posts 72 can be disposed at the second end 62 of the first plate 28.

As best shown in FIG. 3, the support member 16 can define a first opening 74 to present a first wall 76 in which the first post 72 is disposed in the first opening 74 such that the first wall 76 supports the first outlet component 26. When utilizing the plurality of first posts 72, the first opening 74 can be further defined as a plurality of first openings 74 and the first wall 76 can be further defined as a plurality of first walls 76. In this embodiment, one of the first posts 72 is disposed in one of the first openings 74 and another one of the first posts 72 is disposed in another one of the first openings 74, and therefore, the first walls 76 support the first posts 72 and thus the first outlet component 26.

Turning to FIGS. 3, 4 and 8, the second outlet component 36 can include a second post 78 extending outwardly from the outer surface 44 of the second plate 38. The second post 78 can be supported by the support member 16, and the second post 78 supports the second outlet component 36 relative to the support member 16. Simply stated, the second post 78 supports the second outlet component 36 during rotation about the second axis 48. In certain embodiments, the second post 78 can be further defined as a plurality of second posts 78 (see FIG. 4). In this embodiment, one of the second posts 78 can be disposed at the first end 64 of the second plate 38 and another one of the second posts 78 can be disposed at the second end 66 of the second plate 38.

As best shown in FIG. 3, the support member 16 can define a second opening 80 to present a second wall 82 in which the second post 78 is disposed in the second opening 80 such that the second wall 82 supports the second outlet component 36. When utilizing the plurality of second posts 78, the second opening 80 can be further defined as a plurality of second openings 80 and the second wall 82 can be further defined as a plurality of second walls 82. In this embodiment, one of the second posts 78 is disposed in one of the second openings 80 and another one of the second posts 78 is disposed in another one of the second openings 80, and therefore, the second walls 82 support the second posts 78 and thus the second outlet component 36.

In certain embodiments, the outer surface 34 of the first plate 28 can define an arcuate configuration and the outer surface 44 of the second plate 38 can define an arcuate configuration. More specifically, the outer surface 34 of the first plate 28 can be spherical and the outer surface 44 of the second plate 38 can be spherical. When the outer surfaces 34 of the first and second plates 28, 38 are spherical, the support member 16 can define a spherical configuration which allows the first and second outlet components 26, 36 to move between the fully open position, the fully closed position and the partially open/closed position.

As discussed above, the support member 16 and the first and second outlet components 26, 36 are coupled to each other such that the first and second outlet components 26, 36 can rotate relative to the support member 16 (see FIGS. 5-7). Furthermore, the support member 16 and the first and second outlet components 26, 36 are coupled to each other to move together between an up and down position (see FIG. 10) and a side to side position (see FIG. 9). Generally, the up and down position changes the position of the support member 16 and the first and second outlet components 26, 36 up and down relative to the dashboard 12 which reorients the direction the airflow enters the passenger compartment 10, i.e., reorients the direction of the airflow up or down. The side to side position changes the position of the support member 16 and the first and second outlet components 26, 36 left and right relative to the dashboard 12 which reorients the direction the airflow enters the passenger compartment 10, i.e., reorients the direction of the airflow left or right.

Turning to FIGS. 2 and 3, the airflow outlet assembly 14 can include one or more of a trim member 84, a sleeve 86, a fitting 88 and a housing 90. The sleeve 86 surrounds the support member 16, and the support member 16 can move relative to the sleeve 86 between the up and down position and the side to side position. Furthermore, the housing 90 surrounds the sleeve 86 and the support member 16, and the support member 16 can move relative to the housing 90 between the up and down position and the side to side position. Additionally, the first and second outlet components 26, 36 can move relative to the sleeve 86 and the housing 90 between the fully open position, the fully closed position and the partially open/closed position. Therefore, the sleeve 86 and the housing 90 remain stationary.

The housing 90 can be formed as a single or unitary piece or a plurality of pieces. For example, as shown in FIG. 3, the housing 90 can include a first portion 92 and a second portion 94, i.e., the plurality of pieces. The first and second portions 92, 94 cooperate with each other. It is to be appreciated that the first and second portions 92, 94 can include one or more of tabs, fasteners, clips, snaps, cutouts, etc. to attach or secure the first and second portions 92, 94 together.

Continuing with FIG. 3, the housing 90 can include a front edge 96 and a back edge 98 spaced from each other along a longitudinal axis 100. The front edge 96 faces the passenger compartment 10 and the back edge 98 faces away from the passenger compartment 10. In certain embodiments, the longitudinal axis 100 is disposed between and transverse to the first and second axes 46, 48. In one embodiment, the first and second axes 46, 48 define a plane therebetween and the longitudinal axis 100 is disposed substantially perpendicular to the plane.

The trim member 84 covers the first edge and can be visible from inside the passenger compartment 10. Generally, the trim member 84 remains stationary. The back edge 98 cooperates with a duct of the HVAC unit and is not visible from inside the passenger compartment 10. The fitting 88 can be coupled to the back edge 98 and can cooperate with the duct to minimize airflow leaking out between the back edge 98 and the duct.

The housing 90 can include one or more couplings 102 to secure the airflow outlet assembly 14 to the dashboard 12. The couplings 102 can be one or more of tabs, fasteners, clips, snaps, cutouts, etc. to attach or secure the airflow outlet assembly 14 to the dashboard 12.

The airflow outlet assembly 14 minimizes the number of components 26, 36 utilized which reduces costs and assembly time while providing the desired airflow with the passenger compartment 10. Specifically, the airflow outlet assembly 14 can eliminate the rotary knob and the drive mechanism as discussed in the background section. The airflow outlet assembly 14 also minimizes the size of the components 26, 36 while providing the desired airflow with the passenger compartment 10. Specifically, the airflow outlet assembly 14 is sized to minimize a fore-aft depth 104 (see FIG. 2), which reduces the packaging space and can increase aesthetics of the airflow outlet assembly 14. The fore-aft depth 104 extends along the longitudinal axis 100. For example, the fore-aft depth 104 of the airflow outlet assembly 14 can be reduced from about 11.0 millimeters as compared to the vent described in the background section. Additionally, the area that the airflow can flow through the airflow outlet assembly 14 is larger than the vent discussed in the background section. As such, more airflow can be in communication with the passenger compartment 10 utilizing the airflow outlet assembly 14 described herein as compared to the vent described in the background section.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An airflow outlet assembly comprising:
   a support member;
   a first outlet component including a first plate and a plurality of first vanes spaced from each other to define an open space between respective first vanes, with each of the first vanes extending outwardly from the first plate, with the first outlet component being supported by the support member;
   a second outlet component including a second plate and a plurality of second vanes spaced from each other to define an open space between respective second vanes, with each of the second vanes extending outwardly from the second plate, with the second outlet component being supported by the support member, and with the first and second outlet components rotatably coupled to each other such that rotation of the first and second outlet components in opposite directions changes the position of the first and second plates and the first and second vanes relative to the support member; and
   wherein the first vanes each extend to a distal end spaced from the second plate, and the second vanes each extend to a distal end spaced from the first plate, with the distal end of the respective first vanes extending beyond the distal end of the respective second vanes such that the first and second vanes partially overlap.

2. The assembly as set forth in claim 1 wherein the first outlet component is rotatable relative to the support member about a first axis and the second outlet component is rotatable relative to the support member about a second axis, with the first and second axes spaced from and substantially parallel to each other such that the first and second outlet components rotate in opposite directions about separate first and second axes respectively.

3. The assembly as set forth in claim 2 wherein the first outlet component includes a first gear rotatable about the first axis and the second outlet component includes a second gear rotatable about the second axis, with the first and second gears meshing together such that rotation of the gears correspondingly rotate the first and second outlet components in opposite directions.

4. The assembly as set forth in claim 3 wherein the first plate includes a first end and a second end spaced from each other along the first axis, with the first gear disposed at one of the first and second ends of the first plate, and wherein the second plate includes a first end and a second end spaced from each other along the second axis, with the second gear disposed at one of the first and second ends of the second plate.

5. The assembly as set forth in claim 4 wherein:
   the first gear is further defined as a plurality of first gears, with one of the first gears disposed at the first end of the first plate and another one of the first gears disposed at the second end of the first plate;
   the second gear is further defined as a plurality of second gears, with one of the second gears disposed at the first end of the second plate and another one of the second gears disposed at the second end of the second plate; and
   one of the first gears and one of the second gears mesh together, and another one of the first gears and another one of the second gears mesh together.

6. The assembly as set forth in claim 1 wherein the first vanes and the second vanes are disposed in an alternating pattern.

7. The assembly as set forth in claim 6 wherein:
   the first plate includes an inner surface and an outer surface opposing the inner surface of the first plate, with the first vanes extending from the inner surface of the first plate; and
   the second plate includes an inner surface and an outer surface opposing the inner surface of the second plate, with the second vanes extending from the inner surface of the second plate.

8. An airflow outlet assembly comprising:
   a support member;
   a first outlet component including a first plate and a first vane extending outwardly from the first plate, with the first outlet component being supported by the support member;
   a second outlet component including a second plate and a second vane extending outwardly from the second plate, with the second outlet component being supported by the support member, and with the first and second outlet components rotatably coupled to each other such that rotation of the first and second outlet components in opposite directions changes a position of the first and second plates and the first and second vanes relative to the support member;
   wherein the first vane is further defined as a plurality of first vanes spaced from each other and each extending outwardly from the first plate, and wherein the second vane is further defined as a plurality of second vanes spaced from each other and each extending outwardly from the second plate;
   wherein the first vanes and the second vanes are offset from each other such that one of the first vanes is disposed between a pair of the second vanes, and one of the second vanes is disposed between a pair of the first vanes; and
   one of the first vanes includes a first side and one of the second vanes includes a second side, with part of the first side of the one of the first vanes and part of the second side of one of the second vanes abutting each other to create a frictional engagement therebetween to maintain the position of the first and second vanes relative to each other.

9. The assembly as set forth in claim 7 wherein the first outlet component includes a first post extending outwardly from the outer surface of the first plate and is supported by the support member, and the first post supports the first outlet component relative to the support member, and wherein the second outlet component includes a second post extending outwardly from the outer surface of the second plate and is supported by the support member, and the second post supports the second outlet component relative to the support member.

10. The assembly as set forth in claim 9 wherein the first post is further defined as a plurality of first posts, and wherein the first plate extends to a first end and a second end spaced from each other, with one of the first posts disposed at the first end of the first plate and another one of the first posts disposed at the second end of the first plate.

11. The assembly as set forth in claim 10 wherein:
   the second post is further defined as a plurality of second posts, and wherein the second plate extends to a first end and a second end spaced from each other, with one of the second posts disposed at the first end of the second plate and another one of the second posts disposed at the second end of the second plate; and
   the support member is further defined as a collar surrounding the first and second outlet components, and the collar defines a plurality of first openings and a plurality of second openings spaced from the first openings, with each of the first posts disposed in a respective one of the first openings and each of the second posts disposed in a respective one of the second openings.

12. The assembly as set forth in claim 1 wherein:
the first plate includes an inner surface and an outer surface opposing the inner surface of the first plate, with the first vane extending from the inner surface of the first plate;
the second plate includes an inner surface and an outer surface opposing the inner surface of the second plate, with the second vane extending from the inner surface of the second plate; and
the outer surface of the first plate defines an arcuate configuration and the outer surface of the second plate defines an arcuate configuration.

13. The assembly as set forth in claim 12 wherein the outer surface of the first plate defines a first recess for rotating the first outlet component.

14. The assembly as set forth in claim 12 wherein the outer surface of the second plate defines a second recess for rotating the second outlet component.

15. A passenger compartment for a vehicle; the passenger compartment comprising:
a dashboard;
an airflow outlet assembly coupled to the dashboard, the assembly including:
a support member;
a first outlet component including a first plate and a plurality of first vanes spaced from each other to define an open space between respective first vanes which allows fluid communication through the open space between the first vanes, with each of the first vanes extending outwardly from the first plate, with the first outlet component being supported by the support member;
a second outlet component including a second plate and a plurality of second vanes spaced from each other to define an open space between respective second vanes which allows fluid communication through the open space between the second vanes, with each of the second vanes extending outwardly from the second plate, with the second outlet component being supported by the support member, and with the first and second outlet components rotatably coupled to each other such that rotation of the first and second outlet components in opposite directions changes a position of the first and second plates and the first and second vanes relative to the support member which changes an amount of fluid communication out of the airflow outlet assembly; and
wherein the first vanes each extend to a distal end spaced from the second plate, and the second vanes each extend to a distal end spaced from the first plate, with the distal end of each of the second vanes disposed in the respective open space between the respective first vanes, and the distal end of each of the first vanes disposed in the respective open space between the respective second vanes.

16. The passenger compartment as set forth in claim 15 wherein the first outlet component is rotatable relative to the support member about a first axis and the second outlet component is rotatable relative to the support member about a second axis, with the first and second axes spaced from and substantially parallel to each other such that the first and second outlet components rotate in opposite directions about separate first and second axes respectively.

17. The passenger compartment as set forth in claim 16 wherein the first outlet component includes a first gear rotatable about the first axis and the second outlet component includes a second gear rotatable about the second axis, with the first and second gears meshing together such that rotation of the gears correspondingly rotate the first and second outlet components in opposite directions.

18. The passenger compartment as set forth in claim 17 wherein:
the first plate includes a first end and a second end spaced from each other along the first axis and wherein the first gear is further defined as a plurality of first gears, with one of the first gears disposed at the first end of the first plate and another one of the first gears disposed at the second end of the first plate;
the second plate includes a first end and a second end spaced from each other along the second axis and wherein the second gear is further defined as a plurality of second gears, with one of the second gears disposed at the first end of the second plate and another one of the second gears disposed at the second end of the second plate; and
one of the first gears and one of the second gears mesh together, and another one of the first gears and another one of the second gears mesh together.

19. The passenger compartment as set forth in claim 15 wherein:
the first vane is further defined as a plurality of first vanes spaced from each other;
the first plate includes an inner surface and an outer surface opposing the inner surface of the first plate, with the first vanes extending from the inner surface of the first plate;
the second vane is further defined as a plurality of second vanes spaced from each other; and
the second plate includes an inner surface and an outer surface opposing the inner surface of the second plate, with the second vanes extending from the inner surface of the second plate.

20. The passenger compartment as set forth in claim 19 wherein the first vanes and the second vanes are offset from each other such that one of the first vanes is disposed between a pair of the second vanes, and one of the second vanes is disposed between a pair of the first vanes.

* * * * *